United States Patent
Shaban et al.

(10) Patent No.: US 8,552,573 B2
(45) Date of Patent: Oct. 8, 2013

(54) METHOD AND APPARATUS OF CONVERTING THE IMPACT OF HYDROMETEORS INTO PRACTICAL ENERGY WITH A MECHANICAL CAPACITOR, AND TO ELECTRICITY VIA ELECTROMAGNETIC INDUCTION

(76) Inventors: Yasser Ragab Shaban, Sofia (BG); Milen K. Panteleev, Concord, CA (US)

( * ) Notice: Subject to any disclaimer, the term of this patent is extended or adjusted under 35 U.S.C. 154(b) by 234 days.

(21) Appl. No.: 13/072,813

(22) Filed: Mar. 28, 2011

(65) Prior Publication Data

US 2012/0250215 A1      Oct. 4, 2012

(51) Int. Cl.
*F02B 63/04*          (2006.01)
*F02B 67/04*          (2006.01)

(52) U.S. Cl.
USPC .......................................................... 290/1 E

(58) Field of Classification Search
None
See application file for complete search history.

(56) References Cited

U.S. PATENT DOCUMENTS

| 6,407,484 | B1* | 6/2002 | Oliver et al. | 310/339 |
| 7,479,727 | B1* | 1/2009 | Grace | 310/339 |
| 2010/0072859 | A1* | 3/2010 | Jager et al. | 310/323.21 |

* cited by examiner

*Primary Examiner* — Tulsidas C Patel
*Assistant Examiner* — Thomas Quigley

(57) ABSTRACT

The aim of the present invention is to harvest the improvised impact of the hydrometeors into a practical mechanical energy with the use of mechanical capacitor. Consequently, the mechanical energy is converted into electricity via the principal of electromagnetic induction.

2 Claims, 8 Drawing Sheets

US 8,552,573 B2

METHOD AND APPARATUS OF CONVERTING THE IMPACT OF HYDROMETEORS INTO PRACTICAL ENERGY WITH A MECHANICAL CAPACITOR, AND TO ELECTRICITY VIA ELECTROMAGNETIC INDUCTION

CROSS-REFERENCE TO RELATED APPLICATIONS

Not Applicable.

STATEMENT REGARDING FEDERALLY SPONSORED RESEARCH OR DEVELOPMENT

Individual Efforts

BACKGROUND

The idea of converting the energy of hydrometeors into electricity perhaps goes back to the early work of Madden et al. (1998)[1] and Förster et al. (2004)[2]. It was for the purpose of measuring the kinetic energy of raindrops with the use of piezoelectric device. A more perspective work was performed by Salmi and Ikonen (2005)[6] with the use of "The Vaisala RAINCAP sensor". The work was aimed on acoustic detection of individual raindrop impacts. However, Jean-Jacques Chaillout et al. (2008)[3] from France's Atomic Energy Commission (CEA) in Grenoble had claimed the first whom recognized the importance of converting the impact energy of raindrops into electricity.

Obviously, the work of Jean-Jacques Chaillout and his colleagues dealt with the conversion of the impact energy of "rain drops" with the use of piezoelectric materials under controlled conditions (indoor).

REFERENCES

[1] Madden, L. V., L. L. Wilson, and N. Ntahimpera, 1998: Calibration and evaluation of an electronic sensor for rainfall kinetic energy. Phytopathology, 88, 950-959.
[2] Förster, J. G. Gust, and S. Stolte, "A piezoelectrical rain gauge for application on buoys". J. Atmos. Oceanic. Technol., 21, 179-193, 2004.
[2] Salmi, A., and J. Ikonen, "New piezoelectric Vaisala RAINCAP precipitation sensor", 19th Conf. of Hydrology, San Diego, Amer. Meteor. Soc., P2.6, 2005.
[3] http://physicsworld.com/cws/article/news/32628, Jun. 29, 2008.

BRIEF DESCRIPTION OF DRAWINGS

Figures included in this invention are briefly described as follows.

SUMMARY OF THE INVENTION

Figure 12:
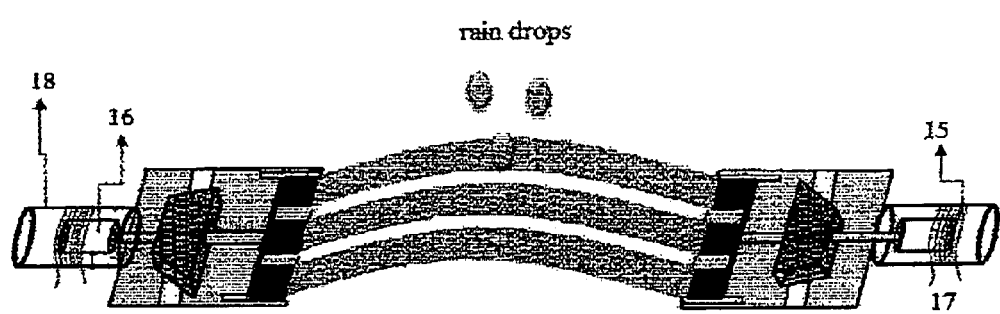
FIG. 12 The setup of converting the total energy of raindrops into electricity.

One embodiment of the present invention is the mechanical convertor and capacitor. The whole unit is named: the mechanical capacitor. The mechanical capacitor comprises the following elements as indicated by their numbers in FIG. 1: the mechanical convertor is composed of a series of rips (1) which is made of two sheets of thin metals and filling e.g. silicone gel, a cap (4) seals each rip, a metal sheet (9) which groups the caps of all rips, an element of ditcher (3) with a substantially frictionless track (12), a rod (7) which is orthogonal to the element 9, a rod (7) is for the purpose of transferring the horizontal force from the mechanical convertor to the mechanical capacitor, a mechanical capacitor (5) is a three-dimension trapezoid shaped filled with silicone gel with shorter sides at "a and b", element 5 further comprises elements 13 and 14 which are made of flexible materials such as rubber, element 5 further comprises the remaining sides made of hard materials, an element 10 made of hard material which holds the mechanical capacitor onto stationary element 6 which is made of hard materials, and a rod (8) which transfers the horizontal force from the mechanical capacitor to the electromagnetic induction unit (as shown in FIG. 12).

Second embodiment is the conversion of the total energy of hydrometeors (raindrops) into electricity with the application of the present mechanical capacitor and the principal of the electromagnetic induction.

DETAILED DESCRIPTION OF THE INVENTION

I) The Mechanical Capacitor

An artificial non-harmonic sinusoidal wave or sinusoidal-energy is generated, general speaking, from electric oscillators. Whereas a harmonic sinusoidal oscillation results from an applied force onto a specific geometry in ways the oscillation is sustained for a period of time after the relief of force. In this case, the force can be supplied once or through pulses with a time delay to ensure the non-destructive interference.

In order to harvest a useful energy from a swift action or force, e.g. rains, the force must be converted into practical mechanical energy by breaking it into primary and secondary actions. While the primary action is the direct conversion of the vertical impact energy of rain drops into horizontal impact energy, the secondary action is the control of the event.

Figure 1:
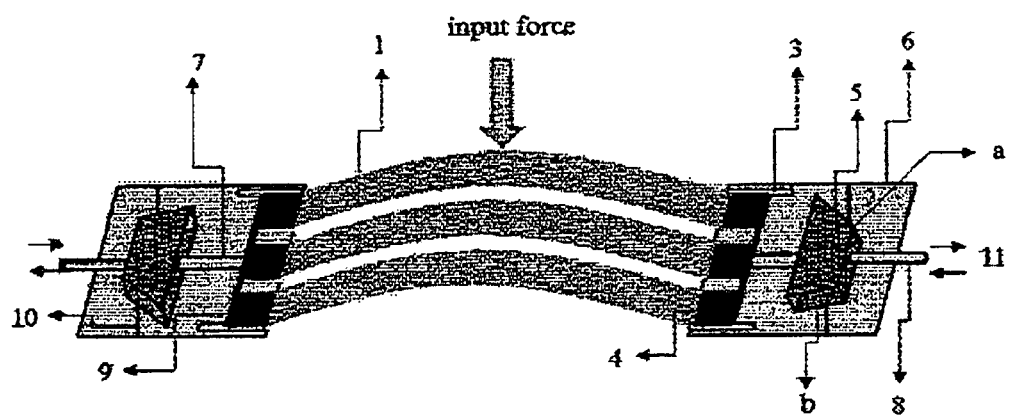
FIG. 1 An overview of the mechanical capacitor, the basic components is detailed in the following figures.
Figure 2:
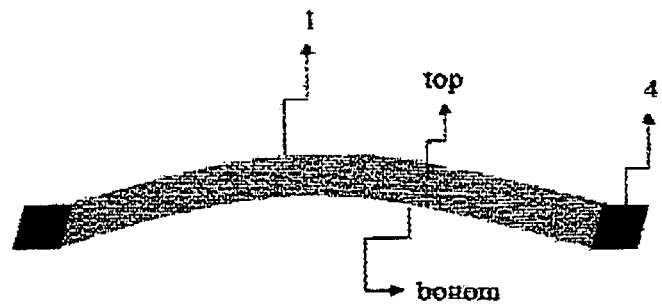
FIG. 2 Illustration of the geometry of the mechanical convertor. It shows the rip and cap.
Figure 3:
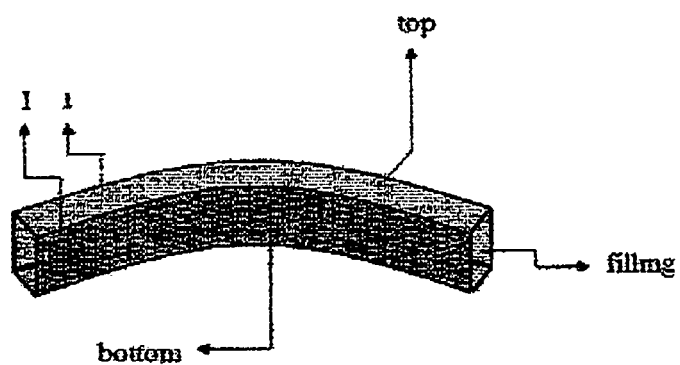
FIG. 3 The detailed structure of the rip.
Figure 4:
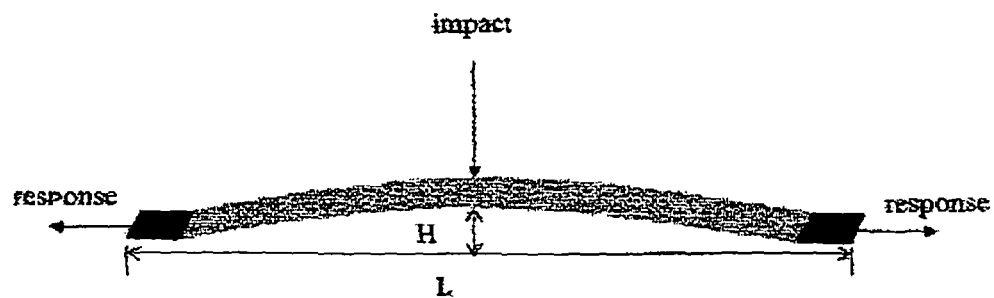
FIG. 4 The configuration of the rip under impact.
Figure 5:
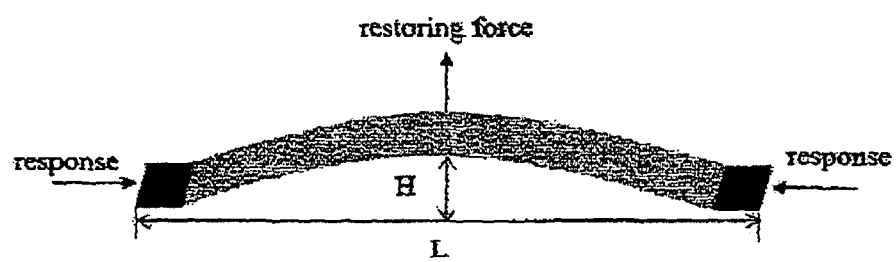
FIG. 5 The restoring configuration of the rip.
Figure 6:
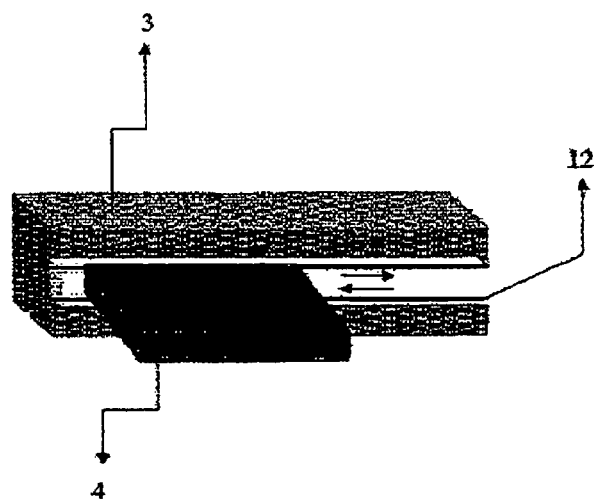
FIG. 6 The geometry of the cap and ditcher.

The mechanical capacitor, FIG. 1, is composed of two units. The first unit is the mechanical convertor which is composed of a series of rips (denoted I at the diagram) that are designed to arc at the middle and smoothed at the edges as shown in FIG. 2. Each rip is composed of three layers as shown in FIG. 3. The thinnest layers are metals (1), the top and bottom layers confines a thicker layer which is a bladder filled with silicone gel, or silicone resin, or rubber. Silicone gel when it is manufactured or milled can be shaped into almost any imaginable configuration or style. A cap (4) seals each rip (with its three layers) at its end, made of frictionless material. When the rip suffers a vertical force or impact it extends from its edges as shown in FIG. 4. The depth of falling H' and the total extension L' depend on the design of the rip, the size of the impact and the filling materials, here silicone gel. When the force is ceased the rip restores its configuration: i.e. its normal height H and width L as shown in FIG. 5. A frequency of vibrations of the apparatus is greater than a frequency of the rain drops. The cap of the rip is allowed to move forward and backward inside a ditcher (3), which confines a frictionless track (12) allowing a smooth motion as shown in FIG. 6.

To increase the contact area with the rain drops, several rips are grouped with an element (9); a stiff and light material such as alumina. The whole unit, mechanical convertor, is allowed to move in two ditchers in each side of the diagram (four ditchers per unit). Hence, the purpose of the mechanical convertor is to transfer the vertical impact into horizontal motion. Due to the swift impact of the rain drops, the first unit will be unlikely restoring its normal configuration.

Figure 7:
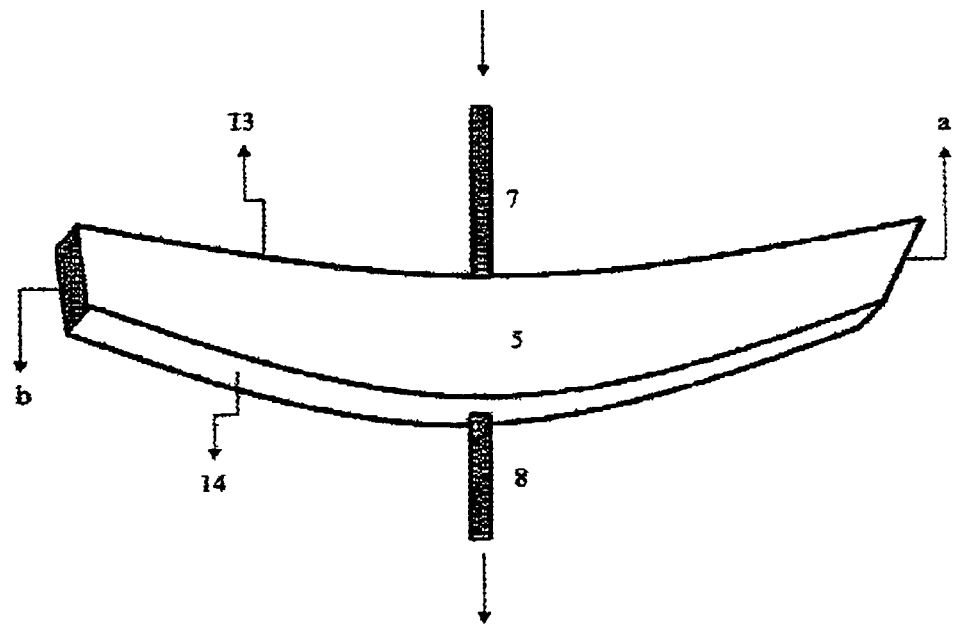
FIG. 7 The configuration of the mechanical capacitor during charging.
Figure 8:
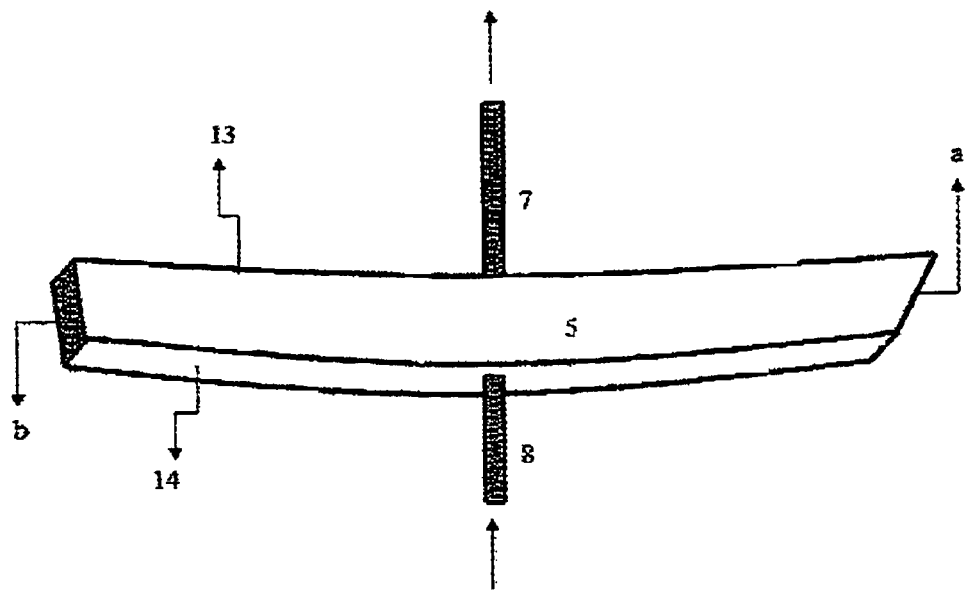
FIG. 8 The configuration of the mechanical capacitor during discharging.

The second unit is the mechanical capacitor which is attached to the first unit by a rod (denoted 7 in FIG. 1). The mechanical capacitor, denoted 5 in FIG. 1, is a three-dimension trapezoid. All sides (5) are made of stiff material except the inlet side (13) and the exit side (14); they are made of elastic material with equal elasticity. Moreover the surface area, Ai, of the inlet side (13) is greater than surface area, Ae, at the exit side (14). The whole unit is fixed to the stationary element 6 from sides "a and b" as indicated in FIG. 1. The mechanical capacitor composes a bladder filled with silicone gel similar to the first unit but it is thicker than the first unit. When the inlet side receives a horizontal force via the rod it contracts inward as shown in FIG. 7. Due to the flexibility of the filling, the exit side will extend outward. Both sides are contracting unequally. FIG. 8 shows both sides at normal configuration.

Figure 9:
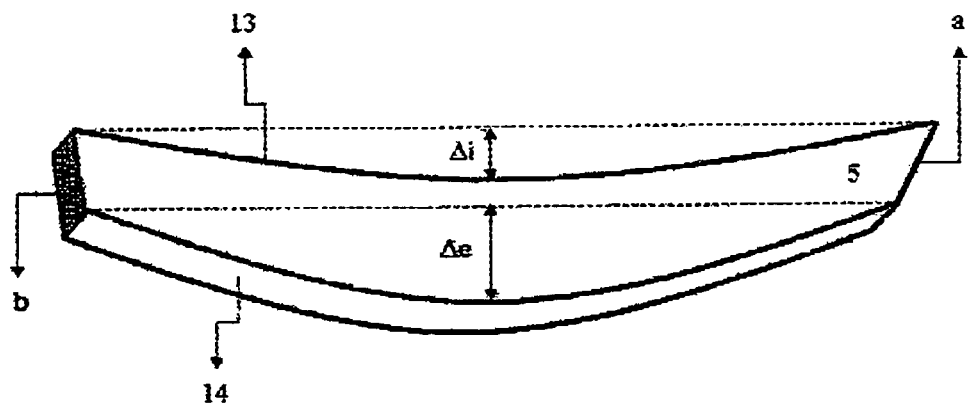
FIG. 9 The size of the energy at the inlet and exit of the mechanical capacitor during charging.

Since the energy is conserved; the energy at the inlet side (13) Ei is equal to the energy at the exit side (14) Ee. So for equal energies at both sides of unequal areas;

$$Fi \times \Delta i = Fe \Delta \Delta e, \quad (1)$$

Where Fi and Fe are the forces at the inlet and exit, $\Delta i$ and $\Delta e$ are the distance of bending at the inlet and exit respectively as shown in FIG. 9. Because of the conservation of the volume; Vi=Ve, the amount of contraction or the distance of bending at the exit side (14) must be greater than the distance of bending at the inlet (13). Hence, $\Delta e$ is greater than $\Delta i$, and consequently Fe is less than Fi.

Because of the instability of configuration, the inlet side (13) will restore its normal configuration earlier than the exit side (14), and both forcing the first unit (mechanical convertor) to restore its normal configuration. In that sense, the secondary unit operates similar to the "capacitor" known in electricity since it enlarges or amplifies the distance of motion from the exit side which is a favorable as far as the unit of electromagnetic induction is concerned as will be shown later.

Figure 10:
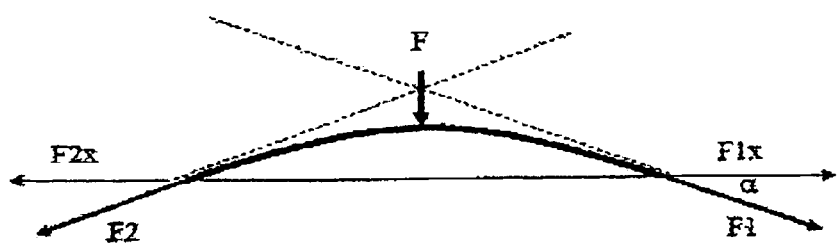
FIG. 10 The force diagram of the rip.
Figure 11:
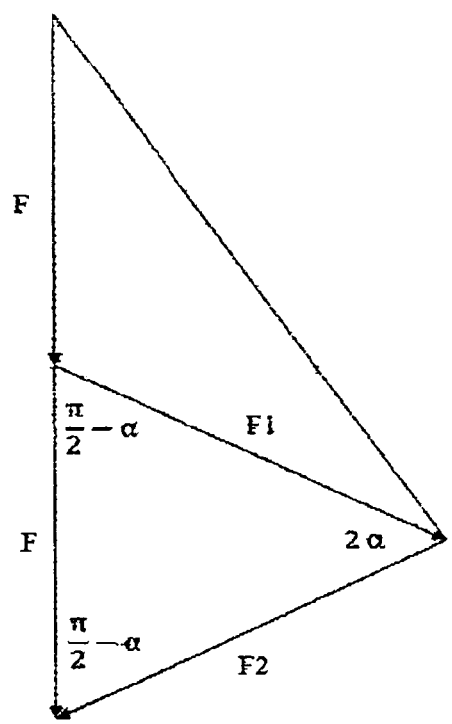
FIG. 11 The trigonometric of the rip.

The force analysis of the rip is shown as following. When the rip is subject to force F it blows into two equal forces F1 and F2 as shown in FIG. 10. Both forces are acting tangent to the sides of the curved portion. From FIG. 11, according to the sine angle law, both forces can be found $$F/\sin 2\alpha = F1/\sin((\pi/2)-\alpha). \quad (2)$$

Where $\alpha$ is the inclination of the tangent to rip from the surface or the x-axis. With further simplification, F and F1 are given by $$F/\sin 2\alpha = F1/\cos \alpha. \quad (3)$$

Then;

$$F1 = F/(2 \sin \alpha), \quad (4)$$

$$F2 = F/(2 \sin \alpha). \quad (5)$$

The horizontal forces F1x and F2x are given by $$F1x = (\cos \alpha) F/(2 \sin \alpha), \quad (6)$$

$$F2x = (\cos \alpha) F/(2 \sin \alpha). \quad (7)$$

It should be mentioned that, F1x and F2x given by equations 5 and 6 are the inlet forces (Fi) from both sides of the apparatus.

II) The Potential Power from Hydrometeors

The potential power delivered by the raindrops, P, can be found from the following relation $$P = \rho h g Q. \quad (8)$$

Where $\rho$ is the density of water (=1000 kg/m$^3$), h is the height at which the rain falls (an average of 2000 m above the sea level), g is the acceleration constant (=9.81 m/s$^2$), and Q is the rain flow rate (the volume of the global precipitation, annually, is equal to $1.6 \times 10^7$ m$^3$/s). The total available power P from the hydrometeors therefore equals $310,000 \times 10^9$ watt or 310,000 GW. About one-third of the total power can be converted into electric power, thus the total electric power from hydrometeors is approximately equal to 100,000 GWe.

The impact energy of one raindrop is 20.85 J/kg. If we consider a raindrop of 5 mm diameter and we assume the drop has a spherical shape, then the impact energy is 1.4 mJ. The typical FWHM of the generated pulse from a raindrop is 1 msec, hence the impact power is 1.4 W and the power density is 1.27 W/cm$^2$. The average repetition rate is 0.07 sec or about 14 rain drops are hitting the same spot per second.

The proper conversion of the impact energy of the rain drop includes a mechanism such as shown in FIG. 12. It includes the mechanical capacitor as explained before plus a unit of electromagnetic induction. The potential impact of the raindrop will be converted into linear vibration, back-and-forth, via the mechanical convertor, and controlled by the mechanical capacitor. By placing a permanent magnet (16), with its poles indicates to the axial direction, inside a cylindrical tube (18) with an electric coil (15) wired around it from the external perimeter. The larger is the coil, the greater is the electric power extracted from the unit. Knowing that, the distance of bending $\Delta e$ gets larger at the exit of the mechanical capacitor, hence the coil can be designed to include larger volume.

When the raindrop falls onto the surface of the rips it enforce the rips to extend outward and pushing the rode (7) to push the elastic element (13) inward. Consequently, the filling materials will push the elastic element (14) outward with a larger distance of bending and pushing the rod (8) to a distance equal to $\Delta e$ inside the tube (18). Once the elastic element (13) reaches to its maximum distance of bending it will restore its normal configuration, pulling the element 14 inward, and consequently forcing the rod (8) to move outward (still inside the tube). Such motion generates an alternating current AC at the terminal points (17). When the second unit restores its normal configuration, it will enforce the rips to restore its normal configuration as well.

What is claimed is:

1. An apparatus for harvesting impact energy of raindrops, comprising:
 a mechanical converter comprising a plurality of rips, wherein each said rip comprises two sheets of thin metals filled with silicone gel, each rip being provided with a sealing cap at each end;
 each of said caps having a first end and a second end; said first end being connected to one of said plurality of rips;

metal sheets connecting the caps of said plurality of rips at respective ends;
wherein said caps are allowed to move in an element of a ditcher having a substantially frictionless track;
a first rod attached to each of the metal sheets and transfers a force from the rips to a mechanical capacitor;
wherein the mechanical capacitor is a three-dimensional trapezoid shape filled with silicone gel, with an inlet side and an outlet side made of elastic material and the remaining sides, being made of rigid material, each of said mechanical capacitor being fixed to a stationary element, and said first rod being connected to the inlet side of the capacitor; the outlet side being connected to a second rod; the inlet side having larger cross section than the outlet side;
a force from the first rod is transferred to the second rod through the mechanical capacitor; the second rod is adapted to be attached to an electromagnetic induction element;
wherein impact of the rain drops on said rips causes displacement of said rips, which in turn causes displacement of said first and second rods, thereby generating electricity by induction.

2. The apparatus of claim 1, wherein a frequency of vibrations of the apparatus is greater than a frequency of the rain drops.

* * * * *